United States Patent [19]

Gray

[11] 4,357,227

[45] Nov. 2, 1982

[54] CATHODE FOR CHLOR-ALKALI CELLS

[75] Inventor: Thomas J. Gray, Guilford, Conn.

[73] Assignee: Olin Corporation, New Haven, Conn.

[21] Appl. No.: 236,479

[22] Filed: Feb. 20, 1981

Related U.S. Application Data

[60] Division of Ser. No. 80,745, Oct. 1, 1979, Pat. No. 4,289,650, which is a continuation-in-part of Ser. No. 25,153, Mar. 29, 1979, Pat. No. 4,240,895.

[51] Int. Cl.$^3$ .................. C25B 11/02; C25B 11/06; B01J 35/10
[52] U.S. Cl. ............................... 204/290 R; 204/293; 204/290 F; 252/477 Q
[58] Field of Search ............. 204/290 R, 290 F, 292, 204/293; 252/477 Q

[56] References Cited

U.S. PATENT DOCUMENTS

| | | | |
|---|---|---|---|
| 3,673,116 | 6/1972 | Richter | 252/466 J |
| 4,043,946 | 8/1977 | Sanker et al. | 252/466 J |
| 4,049,580 | 9/1977 | Oden et al. | 252/466 J |
| 4,248,679 | 2/1981 | Welch et al. | 204/98 |
| 4,248,780 | 2/1981 | Carlin | 204/98 |
| 4,251,478 | 2/1981 | Welch et al. | 204/98 |
| 4,278,568 | 7/1981 | Lohrberg et al. | 252/472 |

FOREIGN PATENT DOCUMENTS 400343 2/1974 U.S.S.R. .............................. 252/417

Primary Examiner—F. Edmundson
Attorney, Agent, or Firm—Arthur E. Oaks; Donald F. Clements

[57] ABSTRACT

An improved cathode with a conductive metal core and a Raney-type catalytic surface predominantly derived from an adherent ternary aluminide intermetallic crystalline precursory outer portion of the metal core is disclosed. The precursory outer portion preferably has molybdenum and titanium added to give a precursor alloy having the formula $Ni_xMo_yTi_zAl_3$ where x is within the range of from about 74 to about 94 weight percent, y is within the range of from about 5 to about 20 weight percent and z is within the range of from about 1 to about 5 weight percent of the Ni-Mo-Ti portion of the alloy. Also disclosed is a method of producing a low overvoltage cathode. The method includes the steps of taking a Ni-Mo-Ti core or substrate having about 5–20 weight percentage of Mo and about 1–5 weight percent Ti and coating it with aluminum then heat treating to form a Ni-Mo-Ti-Al ternary alloy with mostly $NiAl_3$ (ordered orthorhombic) crystal structure and then leaching out the Al to produce a ternary NiMoTi alloy Raney surface.

3 Claims, 1 Drawing Figure

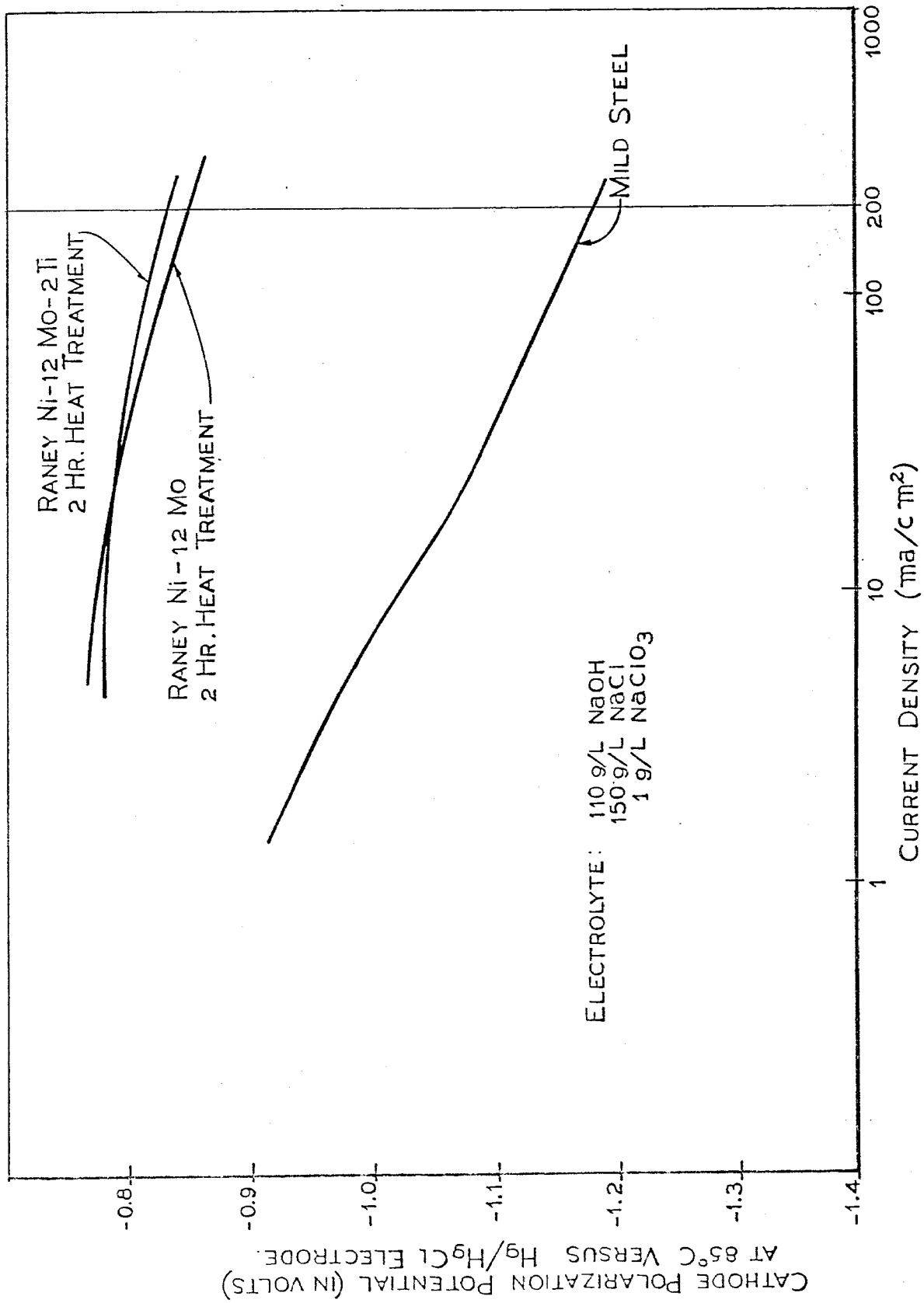

CATHODE FOR CHLOR-ALKALI CELLS

This is a division of application Ser. No. 080,745, filed Oct. 1, 1979 now U.S. Pat. No. 4,289,650, which is a continuation-in-part of my prior copending application Ser. No. 025,153, filed Mar. 29, 1979 now U.S. Pat. No. 4,240,895, commonly assigned, which is incorporated herein by reference as if set forth herein at length.

FIELD OF INVENTION

The invention relates to an improved Raneyized hydrogen evolution cathode for chlor-alkali electrolytic cells.

PRIOR ART STATEMENT

The pertinent prior art has been discussed in great detail in parent application Ser. No. 025,153, (hereinafter called simply "'153 application") and reference is made to that discussion as background for the present application.

SUMMARY OF THE INVENTION

One solution is the present invention which provides an improved low overvoltage electrode for use as a hydrogen evolution cathode in an electrolytic cell, the electrode being of the type that has a Raney metal surface layer in electrical contact with a conductive metal core, wherein said improvement comprises: said Raney metal surface is predominantly derived from an adherent Ni-Mo-Ti-Al quaternary crystalline precursory outer portion of said metal core.

Another solution provided by the invention is an improved low overvoltage electrode for use as a hydrogen evolution cathode in an electrolytic cell, the electrode being of the type that has a Raney metal surface layer in electrical contact with a conductive metal core, wherein the improvement comprises: said Raney metal surface layer is predominantly derived from adherent $(Ni_xMo_yTi_z)Al_3$ crystalline precursory surface layer, where x is less than 0.94, y is within the range of from about 0.05 to about 0.20 and z is with the range of from about 0.01 to about 0.05 weight percent of the NiMoTi portion of the alloy.

A still further solution provided by the invention is an improved low overvoltage electrode for use in a hydrogen evolution cathode in an electrolytic cell, the electrode being of the type that has a Raney metal surface layer in electrical contact with a conductive metal core, wherein the improvement comprises: said Raney metal surface is derived from an adherent Ni-Mo-Ti-Al quaternary crystalline intermetallic layer stabilized by substitution of a stabilizing amount of molybdenum and titanium for some of the nickel in the crystalline structure of said crystalline layer.

Yet another solution provided by the invention is a method of producing a low overvoltage electrode for use as a hydrogen evolution cathode in an electrolytic cell which comprises the steps of:

(a) coating with aluminum the surface of a clean non-porous conductive base metal structure of an alloy of about 5–20 weight percent molybdenum, about 1–5 weight percent Ti and 94–75 percent nickel;

(b) heating treating said coated surface by maintaining said surface at a temperature of from 660° to 750° C. for a time sufficient to diffuse a portion of said aluminum into outer portions of said structure to produce an integral nickel-molybdenum-titanium-aluminum alloy layer in said outer portions consisting predominantly of $NiAl_3$ type grains but insufficient to create a predominance of $Ni_2Al_3$ type grains in said outer portions; and (c) leaching out residual aluminum and intermetallics from the alloy layer until a Raney nickel-molybdenum-titanium layer is formed integral with said structure.

BRIEF DESCRIPTION OF THE DRAWING

The invention will be better understood by reference to the attached drawing which is provided by way of illustration and in which the FIGURE is a graph of polarization potential versus time for a Raney NiMoTi cathode of the present invention as compared with a Raney NiMo cathode prepared according to the disclosure of the '153 application.

DETAILED DESCRIPTION OF PREFERRED EMBODIMENTS

The FIGURE shows the overpotential curves versus current density for two catalytically coated cathodes, that of the present invention and that of the invention of the '153 application both prepared similarly from Beta phase precursor. Each has identical percent by weight of molybdenum (12%) and the same method (dipping) of depositing the aluminum prior to identical heat treatment for two hours at 725° C. However, the cathode of the present invention has 2 percent by weight added titanium. The addition of two (2) percent Ti was found to produce, upon subsequent Raney treatment, a β-Raney Ni-12Mo-2Ti cathode coating having about 50 millivolts less cathode overvoltage than that exhibited by a β-Raney Ni-12Mo cathode coating. The test method was the same as in the '153 application. The reason for this startling difference is not known, although the result was confirmed. It is, however, clear that the difference in titanium content was responsible for the difference in potential since all other parameters were held identical.

It is also noted that, as with added molybdenum alone, an unexpected and surprising result is achieved with both molybdenum and titanium are added to a Beta phase ($NiAl_3$) intermetallic. The Beta phase formation is stabilized by the addition of molybdenum and titanium in the amount of about 5–20 percent by weight and about 1–5 percent by weight, respectively, of the total weight of nickel, titanium and molybdenum. That is, the titanium does not harm this "Beta-stabilizing" effect of the molybdenum. Both molybdenum and titanium are apparently captured in the ordered orthorhombic Beta phase crystal structure such that the Beta phase can be represented by the formula $Ni_xMo_yTi_zAl_3$ where x, y, and z are the weight percent nickel, molybdenum and titanium, respectively, in the total weight of nickel, titanium and molybdenum. By "stabilized" is meant that once the Beta phase forms it has less of a tendency to transform to a Gamma phase ($Ni_2Al_3$) crystal structure and thus the elevated heat treatment temperature can last longer without as much undesirable Gamma phase being formed. In fact, the heat treatment at the optimum 725° C. can last for 2 hours, or 4 hours or even 6 hours with a β-Raney Ni-Mo-Ti cathode still being produced. In fact, two hours was used on the samples in the FIGURE. Since it was shown in the '153 application that the Beta phase is the intermetallic of choice, this is an important advantage of the Ni-Mo-Ti-Al quaternary alloy over Ni-Al binary alloys.

One preferred electrode is a monolithic structure of a Ni-Mo-Ti alloy of 5-20 percent and most preferably from about 12-18 percent by weight molybdenum and about 75-94 percent and most preferably 78-87 percent by weight nickel with from about 1-5 percent by weight titanium which has been given a Raney treatment by dipping in molten aluminum and heating for about 1-360 minutes in an inert atmosphere at a temperature of from about 660° C. to about 855° C. to produce a Beta phase crystal structure. A temperature of about 660° C. to about 750° C. and a time of about 1-30 or even 5-15 minutes are more preferred because this gives sufficient time for enough aluminum to interdiffuse into the nickel to provide maximum preponderance of $NiAl_3$ or Beta phase over Gamma phase ($Ni_2Al_3$) but does not allow enough time for the diffusion to result in the preponderance of undesirable Gamma phase ($Ni_2Al_3$) as is specifically called for in U.S. Pat. No. 4,116,804.

Contrary to the disclosure of U.S. Pat. No. 4,116,804, it has been surprisingly found that the Beta phase $NiAl_3$, with molybdenum and titanium added thereto, is not lost during leaching and in fact experiences no appreciable thinning during subsequent use in a chlor-alkali cell.

The inclusion of from about 1 to about 5 percent by weight titanium in the Ni-Mo alloy in order to produce a NiMoTi ternary alloy has given a further surprise in that a further reduction of 50 millivolts overvoltage (at 200 ma/cm²) in cathode overvoltage is achieved. Since the Raney NiMo alloy coating already exhibited such a low overvoltage it is most surprising that any additional lowering occured from added titanium.

Advantageous use can be made of the electrodes of the invention, expecially as hydrogen-evolution cathodes of cells intended for the electrolysis of brine, water or the like. The electrodes are particularly preferred for use in brine electrolysis cells, wherein the high electrochemical activity of the β-Raney nickel-titanium-molybdenum surface remains constant for long periods of extended continuous use. When the electrode is intended for use in a brine-electrolysis diaphragm cell, the diaphragm can be applied directly to the porous nickel surface of the electrode as noted in the '153 application.

The various parameters associated with the present invention were measured by the techniques described in the '153 application.

What is claimed is:

1. An improved low overvoltage electrode for use as a hydrogen evolution cathode in an electrolytic cell, the electrode being of the type that has a Raney metal surface layer in electrical contact with a conductive metal core, wherein said improvement comprises: said Raney metal surface is predominantly derived from a monolithic structure having an integral adherent Ni-Mo-Ti-Al quaternary Beta phase intermetallic crystalline precursory outer portion of said metal core.

2. The electrode of claim 1 wherein said conductive metal core is a monolithic ternary alloy containing from about 75 to about 94 percent nickel, from about 20 to about 5 percent molybdenum and from about 1 to about 5 percent titanium by weight.

3. The electrode of claim 1 or 2 wherein the thickness of said Raney metal surface is less than about $7.5 \times 10^{-5}$ meters (i.e., 75 microns or 3 mils).

* * * * *